July 19, 1960  T. G. CRAWFORD ET AL  2,945,638
COMPOSITE LAMINATED TUBE
Filed July 10, 1956
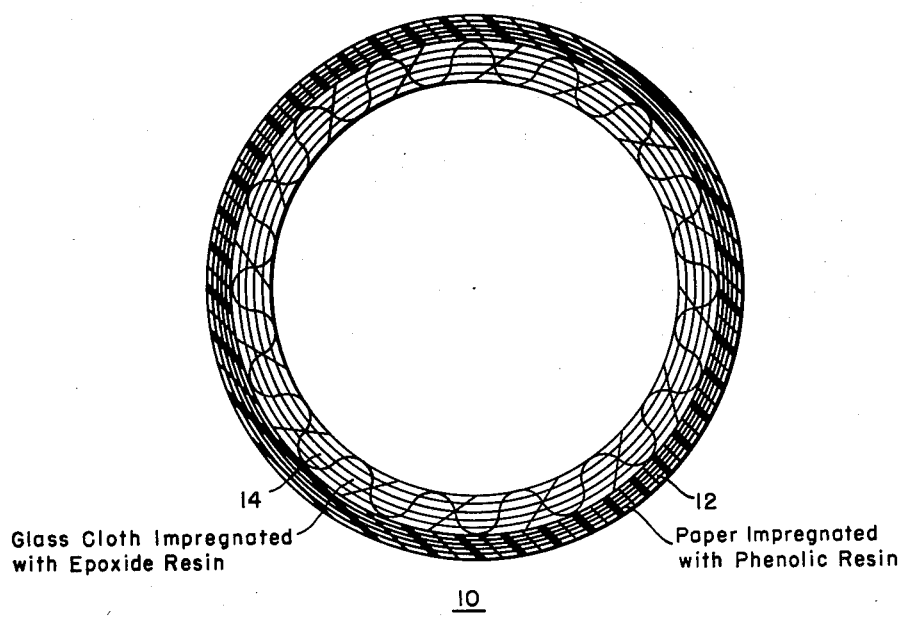
14 — Glass Cloth Impregnated with Epoxide Resin
12 — Paper Impregnated with Phenolic Resin
10
WITNESSES
Edwin E. Bassler
Charles L. Board
INVENTORS
Thomas G. Crawford
& John K. Allen
BY
Frederick Hopper
ATTORNEY United States Patent Office 2,945,638
Patented July 19, 1960

2,945,638

COMPOSITE LAMINATED TUBE

Thomas G. Crawford and John K. Allen, Hampton, S.C., assignors to Westinghouse Electric Corporation, East Pittsburgh, Pa., a corporation of Pennsylvania Filed July 10, 1956, Ser. No. 596,947

3 Claims. (Cl. 242—118.32)

This invention relates to laminated tubing composed of an inner layer of glass fiber sheeting and applied epoxide resin, and an outer layer of paper sheeting and applied phenolic resin.

It has been found that laminated resinous tubes composed of glass cloth and a thermoset epoxide resin are light in weight and possess exceptional physical properties which make them highly desirable for many applications where lightweight, high strength tubes are required. Tubes of such characteristics are desirable in the manufacture of pirns and bobbins for the textile industry. Pirns and bobbins made from resin bonded glass cloth tubes are capable of withstanding the rough handling to which they are often subjected, and also the strain to which they are subjected by the high tensile strength of synthetic textile fibers, such as nylon, polyester, and acrylonitrile polymer fibers. However, the abrasive action of the glass fibers at the surface of the tubes is objectionable in that it is likely to cause splitting, tearing, abrading or snagging of the synthetic textile fibers.

It is, therefore, desirable to provide a tube that possesses all the desirable characteristics of a glass cloth-epoxide resin tube and yet has an outer surface that will stand the winding thereon of synthetic textile fibers and will not cause damage to the synthetic textile fibers so wound thereon.

The object of this invention is to provide a composite resinous tubular member of high strength composed of an inner layer of plies of glass fiber sheet and an applied bonding epoxide resin, and an outer layer of plies of paper sheeting and an applied bonding phenolic resin.

Other objects of the invention will, in part, be obvious and will, in part, appear hereinafter.

For a better understanding of the nature and objects of the invention, reference should be had to the following detailed description and drawing, in which the single figure is a section view through a tube of this invention.

The single figure of the drawing is a section view of a tube 10 of this invention in which an outer layer 12 is composed of paper sheeting with applied phenolic resin and an inner layer 14 composed of glass cloth with applied epoxide resin, bonded together into a unitary member.

In accordance with the present invention, a composite tube having considerable strength and impact resistance together with a smooth, abrasion free, snag-proof outer surface has been produced.

The tubes of this invention comprise a composite thin walled tube or barrel prepared by wrapping a plurality of layers of glass cloth treated with a reactive epoxide resin around a mandrel and then applying an outer layer by wrapping paper treated with a reactive phenolic resin around the first formed layer. The composite tube thus prepared is then cured to a thermoset state. The tube is then stripped from the mandrel and the surface of the outer layer is machined to a smooth snag-free surface. The high strength and smooth snag-free surface of the tubes of this invention make them highly suitable for making bobbins and pirns for the textile industry. They are especially suited for making pirns for handling the high tenacity synthetic resin fibers. The tubes of this invention show excellent bonding of the resins between the interface of the inner and outer layers comprising the tube.

The outer layer of the composite tube of this invention is preferably prepared from paper and a reactive phenolic resin which will permit a composite tube of extremely high strength to be produced. In particular, outstanding results have been obtained when the applied phenolic resin is derived by refluxing phenol and aqueous formaldehyde in the proportions of one mole of phenol and from 1.2 to 1.28 moles of formaldehyde in the presence of alkali sufficient to produce a pH from 7.6 to 8.5 in the mixture, the mixture being refluxed for from 1¼ hours to 2 hours, the mixture being vacuum dehydrated at the end of the period to remove substantially all the water and thereafter the resin being admixed with from 1% to 3% by weight, based on the weight of the phenol, of resorcinol and from 0.5% to 1%, based on the weight of the phenol of aqueous alkali hydroxide at a concentration of from 2% to 5%. Paper, for example, 3 to 6 mil thick kraft paper has given good results, is impregnated with the phenolic resin to provide thereon phenolic resin equal to from 120% to 150% of the weight of the paper. The paper with the applied phenolic resin is passed through an oven or tower to remove the solvent therefrom and to advance it to a B stage wherein the paper has a greenness of from 7% to 14%. Greenness is determined by the test described in U.S. Patent 2,383,-430. Other phenolic resins suitable for carrying out this invention are those set forth in U.S. Patent 2,711,982 and application Serial No. 436,865, now U.S. Patent 2,795,241 issued June 11, 1957, both assigned to the same assignee as the present application.

*Example I*

The following example, in which all parts are by weight, illustrates the preparation of a suitable phenolic resin for use in this invention.

The resin is prepared by reacting in a kettle 1080 parts of phenol and 1130 parts of 37% aqueous formaldehyde. A solution of 4½ parts of sodium hydroxide dissolved in 8 parts of water is added. The pH of the mixture is approximately 7.9. The mixture is refluxed for 1½ hours and then an aqueous solution of 7 parts of sodium hydroxide dissolved in 200 parts of water is stirred into the resin followed by adding 22 parts of resorcinol. The resulting varnish has a resin solids content of 53%.

The inner layer of the composite tube of this invention is prepared from glass cloth or other glass fiber sheet carrying a reactive resinous polymeric epoxide with an appropriate curing agent, which resin when cured functions to provide a good bond between the interface of the inner and outer layers comprising the tube.

The resinous polymeric epoxides, also known as glycidyl polyethers, employed in this invention may be prepared by reacting predetermined amounts of at least one polyhydric phenol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such for example as 4,4'-dihydroxy-diphenyl-dimethyl-methane (referred to hereinafter as bisphenol "A") and 4,4'-dihydroxy-diphenyl-methane. In admixture with the named polynuclear phenols, use also may be made of those polynuclear phenols wherein the phenol nuclei are joined by sulfur bridges such, for example, as 4,4'-dihydroxy-diphenyl-sulfone.

While it is preferred to use epichlorohydrins as the epihalohydrin in the preparation of the resinous polymeric epoxide starting materials of the present invention, other epihalohydrins, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The resinous polymeric epoxide, or glycidyl polyether of a dihydric phenol, suitable for use in this invention has a 1,2-epoxy equivalency greater than 1.0. By epoxy equivalency reference is made to the number of 1,2-epoxy groups

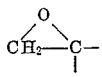

contained in the average molecule of the glycidyl ether.

Owing to the method of preparation of the glycidyl polyethers and the fact that they are ordinarily a mixture of chemical compounds having somewhat different molecular weihgts and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers thus is a value between 1.0 and 2.0. In other cases the epoxide equivalency is given in terms of epoxide equivalents in 100 grams of the resin, and this may vary from about 0.08 to 0.70.

Resinous polymeric epoxides or glycidyl polyethers suitable for use in accordance with this invention may be prepared by admixing and reacting from one mole to two moles proportions of epihalohydrin, preferably epichlorohydrin, with about one mole proportion of bisphenol "A" in the presence of at least a stoichiometric excess of alkali based on the amount of halogen.

To prepare the resinous polymeric epoxides, aqueous alkali, bisphenol "A" and epichlorohydrin are introduced into and admixed in a reaction vessel. The aqueous alkali serves to dissolve the bisphenol "A" with the formation of the alkali salts thereof. If desired, the aqueous alkali and bisphenol "A" may be admixed first and then the epichlorohydrin added thereto, or an aqueous solution of alkali and bisphenol "A" may be added to the epichlorohydrin. In any case, the mixture is heated in the vessel to a temperature within the range of about 80° C. to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali. The resulting epoxy resins may be liquid or solid at room temperature. The solid resins are dissolved in a volatile solvent to form solutions with which the glass cloth is treated.

A suitable catalyst is added to the epoxide resin or solution thereof to provide a resinous composition that will thermoset. The reactive epoxy resins may be admixed with various amines, such, for example, as meta-phenylene-diamine or dicyandiamide, or dicarboxylic acid anhydride, such as phthalic anhydride or maleic anhydride, or triethanolamine borate, or urea-formaldehyde reaction products, or other catalysts well known in the art.

Glass cloth is impregnated with the catalyzed resinous composition to provide thereon epoxide resin equal to from 25% to 40% of the weight of the glass cloth. Glass cloth of a thickness of from 5 to 20 mils has given good results.

The following example illustrates the preparation of a glycidyl polyether suitable for use in this invention.

*Example II*

Fifty-four parts of sodium hydroxide are dissolved in about 600 parts of water in an open kettle provided with a mechanical stirrer. Six hundred eighty-four parts, about 3 moles of bisphenol "A" are added and the resultant mixture is stirred for about 10 minutes at a temperature of about 30° C. Thereafter, 370 parts, approximately 4 moles, of epichlorohydrin are added, whereupon the temperature of the resultant mixture increase to about 60° C. to 70° C. due to the heat of reaction. About 42 parts of caustic soda dissolved in about 9 parts of water then are added with continuous stirring and the mixture is maintained at a temperature of about 90° C. to 100° C. for a period of about one hour. The mixture then is permitted to separate into two layers. The upper layer is withdrawn and discarded and the lower layer is washed with boiling water to which is added acetic acid in an amount sufficient to neutralize unreacted caustic soda. A liquid resinous reactive polymeric epoxide is obtained after substantially all of the wash water has been removed.

The resin may be dissolved in a volatile solvent to produce a satisfactory low viscosity impregnating composition. Approximately 6% by weight of a curing agent, such as dicyandiamide, or 8% by weight of meta phenylene diamine is added to provide an epoxide resin composition that will cure to a thermoset solid state on heating to 130°–160° C. Solvent can be evaporated from the treated cloth.

Examples of other suitable glycidyl polyethers that may be employed in carrying out this invention are those set forth in U.S. Patent No. 2,643,243.

Various epoxy resins have given good results. Thus, the following have been used with success.

(a) An epoxide resin having a melting point of 97–103° C., and an epoxide equivalency of 0.11 to 0.12 per 100 grams of resin, and a 40% solution in butyl Carbitol has a viscosity of R–T on the Gardner-Holdt scale.

(b) An epoxide resin having a melting point of 64–67° C., an epoxide equivalency of from 0.19 to 0.20 per 100 grams of resin and a 40% solution in butyl Carbitol has a viscosity of C–G on the Gardner-Holdt scale.

(c) An epoxide resin having a melting point of 9° C., and an epoxide equivalency of 0.52 per 100 grams.

During the wrapping of the treated paper and the treated glass cloth on the mandrel, the mandrel is maintained at a temperature of from 80° C. to 100° C. and a hot roll is used which is maintained at a temperature of from 150° C. to 165° C. As high a tension as can be applied without tearing the sheets is maintained on the treated paper and glass cloth during wrapping. A pressure of 8 to 10 pounds per lineal inch may be employed with 3.5 mil kraft paper, while a pressure of 10 pounds and more per lineal inch is employed for 9 mil glass cloth.

*Example III*

The following example illustrates the preparation of a tube in accordance with this invention. Glass cloth, 9 mils thick, is dipped into an epoxy resin composition comprising a 50% solution in a volatile solvent of resin (a) under Example II, with 6% dicyandiamide catalyst based on the weight of the resin, until enough resin to equal 30% of the weight of the glass cloth has been applied thereto. The greenness of the glass cloth is approximately 15%, as measured at 165° C. at a pressure of 250 p.s.i. A mandrel at a temperature of about 100° C. is then wrapped with 24 plies of the treated glass cloth under pressure of about 10 pounds per lineal inch. The mandrel, prior to the wrapping operation, is coated with a suitable lubricant such as a silicone lubricant to prevent adhesion thereto of the completed tube. Kraft paper, 3.5 mils thick, which has previously been dipped into the resin composition of Example I and passed into a drying oven until enough resin to equal 135% of the weight of the paper has been applied thereto, is then applied as the outer layer. This is accomplished by wrapping 24 plies of the treated kraft paper about the treated glass cloth under a pressure of 9 pounds per lineal inch. The resulting wrapped unit is then placed in an oven for 2 hours at a temperature of 150° C. The mandrel is then stripped and the resulting tube machined, to provide smooth surfaces thereon, to an outer diameter of 6⅛ inches and an internal diameter of 5⅝ inches, the total length of the tube being 7 inches.

In the finished tube, the thickness of the inner glass-epoxide resin layer should comprise at least 50% of the total wall thickness of the tube and usually will be from 60% to 90% of the total wall thickness of the tube.

The 9 mil thick glass cloth employed in Example III is a unidirectional glass cloth which is commonly available in 38 inch and 60 inch widths. The weight of the cloth is 8.9 ounces per square yard and comprises 49 ends per inch and 30 picks per inch.

The tube of Example III possessed great strength and good rigidity. The tube was subjected to hydraulic pressure of 3400 pounds per square inch with no signs of failure.

The glass cloth employed in this invention preferably comprises pliable woven glass fiber cloth prepared from continuous filament glass fibers for highest strength applications. Woven cloth of a thickness of from 5 to 20 mils has given excellent results. Where the service requirements are not severe, staple glass fibers woven or knitted or even felted into a strong sheet or mat may be employed.

Tubes made in accordance with this invention possess high strength, good impact resistance and good rigidity. The tubes have been successfully employed as high speed bobbins for winding thereon synthetic textile fibers having great tensile strength.

Considerable numbers of bobbins and pirns have been made from such tubing and molded resinous end members and have given good results with nylon and polyethylene glycol-terephthalate fibers.

It will be understood that the above description and drawing are only exemplary, and not in limitation of the invention.

We claim as our invention:

1. A pirn comprising a composite tubular member having high strength capable of withstanding high tensile strength synthetic resin fibers wound thereon and having a smooth snag-free surface for winding said fibers thereon, said composite tubular member comprising (A) an inner layer comprising a plurality of plies of glass fiber sheeting impregnated and bonded together by a thermoset epoxide resin, and (B) an outer layer comprising a plurality of plies of paper sheeting impregnated and bonded together by a thermoset phenolic resin, the resins of said inner layer and said outer layer forming a strong bond at the interface thereof, said inner layer comprising from 50% to 90% of the total wall thickness of the composite tubular member, and said outer layer having a smooth snag-free surface.

2. A tubular member comprising (A) an inner layer comprising a plurality of plies of glass fiber sheeting impregnated and bonded together by a thermoset epoxide resin, and (B) an outer layer comprising a plurality of plies of paper sheeting impregnated and bonded together by a thermoset phenolic resin, the resins of said inner layer and said outer layer forming a strong bond at the interface thereof to form a composite high strength tubular member.

3. A tubular member comprising (A) an inner layer comprising a plurality of plies of woven glass fiber sheeting prepared from continuous filament glass fibers impregnated and bonded together by a thermoset epoxide resin in an amount equal to from 25% to 40% of the weight of the woven glass fiber sheeting, and (B) an outer layer comprising a plurality of plies of kraft paper sheeting impregnated and bonded together by a thermoset phenolic resin in an amount equal to form 120% to 150% of the weight of the kraft paper, the resins of said inner layer and outer layer forming a strong bond at the interface thereof, said inner layer comprising from 50% to 90% of the total wall thickness of the composite tubular member, and said outer layer having a smooth snag-free surface.

References Cited in the file of this patent

UNITED STATES PATENTS

| | | |
|---|---|---|
| 2,001,569 | Kiefer | May 14, 1935 |
| 2,279,630 | McMahon | Apr. 14, 1942 |
| 2,512,996 | Bixler | June 27, 1950 |
| 2,560,299 | McElhinney | July 10, 1951 |
| 2,682,490 | Gams et al. | June 29, 1954 |
| 2,744,845 | Rudoff | May 8, 1956 |
| 2,755,821 | Stahl | July 24, 1956 |
| 2,810,674 | Madden | Oct. 22, 1957 |